United States Patent [19]
Halley

[11] 3,933,169
[45] Jan. 20, 1976

[54] JET ACTION CHEMICAL FEEDING APPARATUS

[75] Inventor: James L. Halley, Mableton, Ga.

[73] Assignee: Tesco Chemicals, Inc., Marietta, Ga.

[22] Filed: Apr. 10, 1975

[21] Appl. No.: 566,833

[52] U.S. Cl. .................. 137/268; 210/62; 210/169; 23/267 A; 239/310
[51] Int. Cl.² .. E03C 1/046; C02B 1/36; E04H 3/20
[58] Field of Search............ 210/62, 169, 65, 242 R; 23/267 A; 137/268; 239/310

[56] References Cited
UNITED STATES PATENTS

| | | | |
|---|---|---|---|
| 2,337,149 | 12/1943 | Bullock | 239/310 X |
| 2,919,178 | 12/1959 | Fletcher et al. | 23/267 A |
| 2,934,409 | 4/1960 | Biehl | 210/242 R UX |
| 3,323,539 | 6/1967 | Schneider et al. | 137/268 |

Primary Examiner—Robert S. Ward, Jr.
Attorney, Agent, or Firm—Jones, Thomas & Askew

[57] ABSTRACT

Apparatus for feeding a quantity of chemical into a stream of liquid by directing a jet of liquid onto a solid soluble body containing the chemical. A chamber receives a solid body of chemical composition which is soluble when exposed to a jet of water or other liquid. The feeding apparatus includes an elongated tube mountable at an inclined angle relative to a horizontal surface, and provided with a liquid inlet at a lowermost lower end to direct a jet of liquid in a longitudinal direction into the tube to impinge against a soluble body of chemical composition received within the tube. A liquid outlet opening is positioned at an uppermost elevation of the inclined tube, so that gas which is evolved from the chemical composition stick and which is not in solution in the liquid can nevertheless flow out of the feeding apparatus through the outlet opening.

8 Claims, 7 Drawing Figures

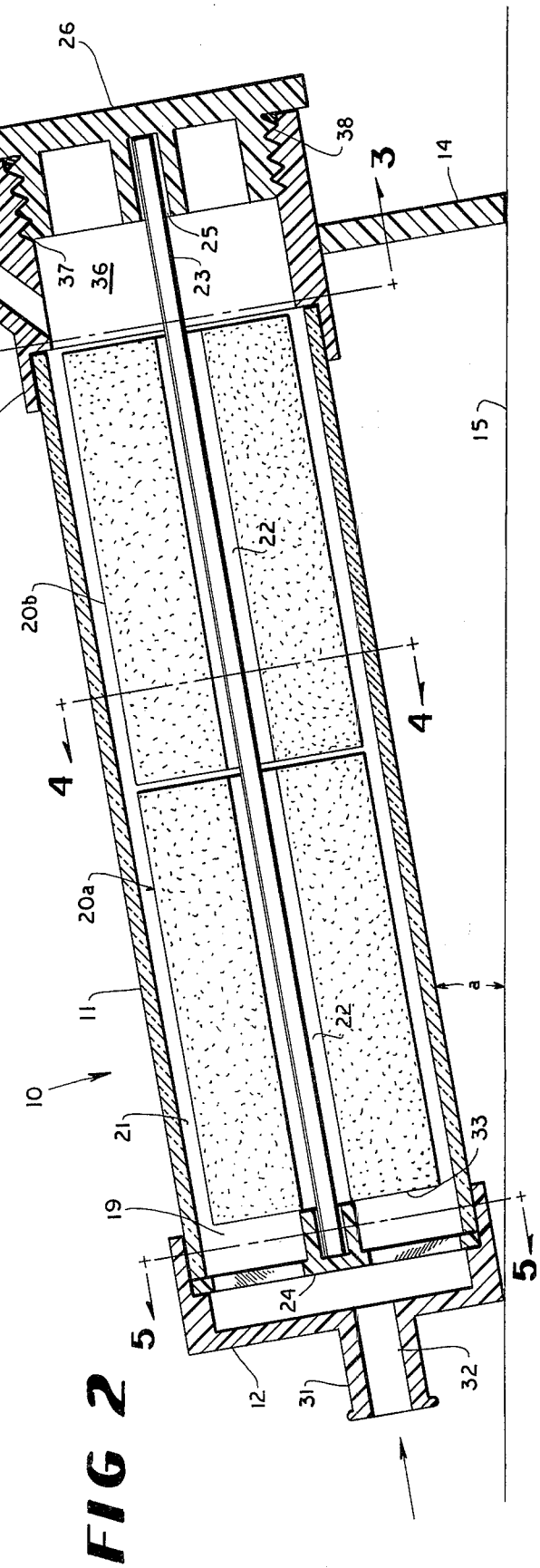
FIG 2
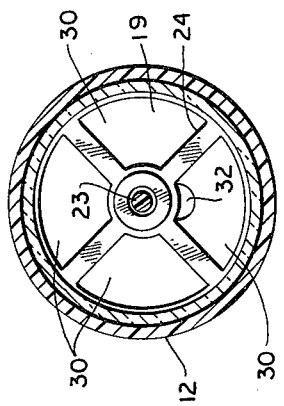
FIG 3
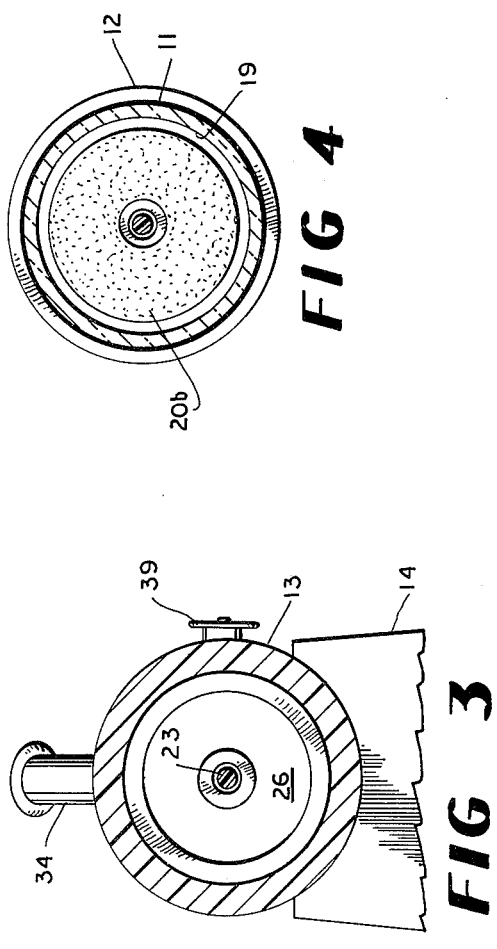
FIG 4
FIG 5

JET ACTION CHEMICAL FEEDING APPARATUS

This invention relates in general to chemical feeding apparatus and in particular to apparatus for adding a quantity of chemical to a liquid stream by gradual erosion of a soluble chemical composition.

Chemical feeding apparatus is known to the prior art which adds a particular chemical substance to a liquid stream by directing the liquid stream onto a solid body of a soluble material which contains the desired chemical to be added to the liquid. One example of such apparatus is found in water conditioning apparatus used to add chemicals to water being recirculated in liquid systems such as swimming pools, by way of example, in which chlorine must be added to the pool water. The water to be chlorinated is recirculated in a path including a solid chemical composition containing a chlorine substance. The chemical composition slowly dissolves upon exposure of the flow of liquid, constantly releasing a controlled quantity of gaseous chlorine which becomes absorbed by the water being returned to the swimming pool. Other examples of solid-chemical feeding apparatus for adding a chemical to a stream of liquid are known to those skilled in the art.

Prior-art chemical feeding apparatus of the foregoing type has generally included some means for directing a liquid stream transversely to the longitudinal axis of an elongate stick of soluble chemical composition, so that the chemical composition stick is eroded by the impact of the water against the stick. Such prior-art apparatus, moreover, generally requires the stick of chemical composition to be maintained substantially in a vertical position, with the transverse stream of liquid striking the stick approximately near the bottom end of the vertical, so that the liquid-soluble stick is maintained by gravity in a position which should ensure exposure to the incoming stream of liquid.

The use of stick feeding apparatus of the type known to the prior art has certain disadvantages, among which is the requirement of a substantial amount of vertical space required for insulation and plumbing of such apparatus. Stick chemical feeding apparatus is not-infrequently installed in relatively cramped quarters, such as a swimming pool pump room or a similar location, and it is frequently difficult to find sufficient vertical clearance for installation of such prior-art equipment. Moreover, it may be difficult to obtain the desired rate of chemical dissolution because of the relatively small area of the chemical stick which is, at any given time, subject to impingement by the incoming stream of liquid.

Accordingly, it is an object of the present invention to provide an improved apparatus for feeding a chemical into a liquid stream.

It is another object of the present invention to provide improved apparatus for feeding a chemical into a liquid stream by flowing the liquid along a solid body of soluble chemical composition.

It is yet another object of the present invention to provide chemical feeding apparatus which can utilize an elongate stick of soluble chemical composition and which has a relatively low physical profile.

Other objects and advantages of the present invention will be understood from the following description of a disclosed embodiment, including the drawing in which:

FIG. 2 shows a section view taken along line 2—2 of FIG. 1;

FIG. 3 shows a section view taken along line 3—3 of FIG. 2;

FIG. 4 shows a section view taken along line 4—4 of FIG. 2;

FIG. 5 shows a section view taken along line 5—5 of FIG. 2;

Figure 1:
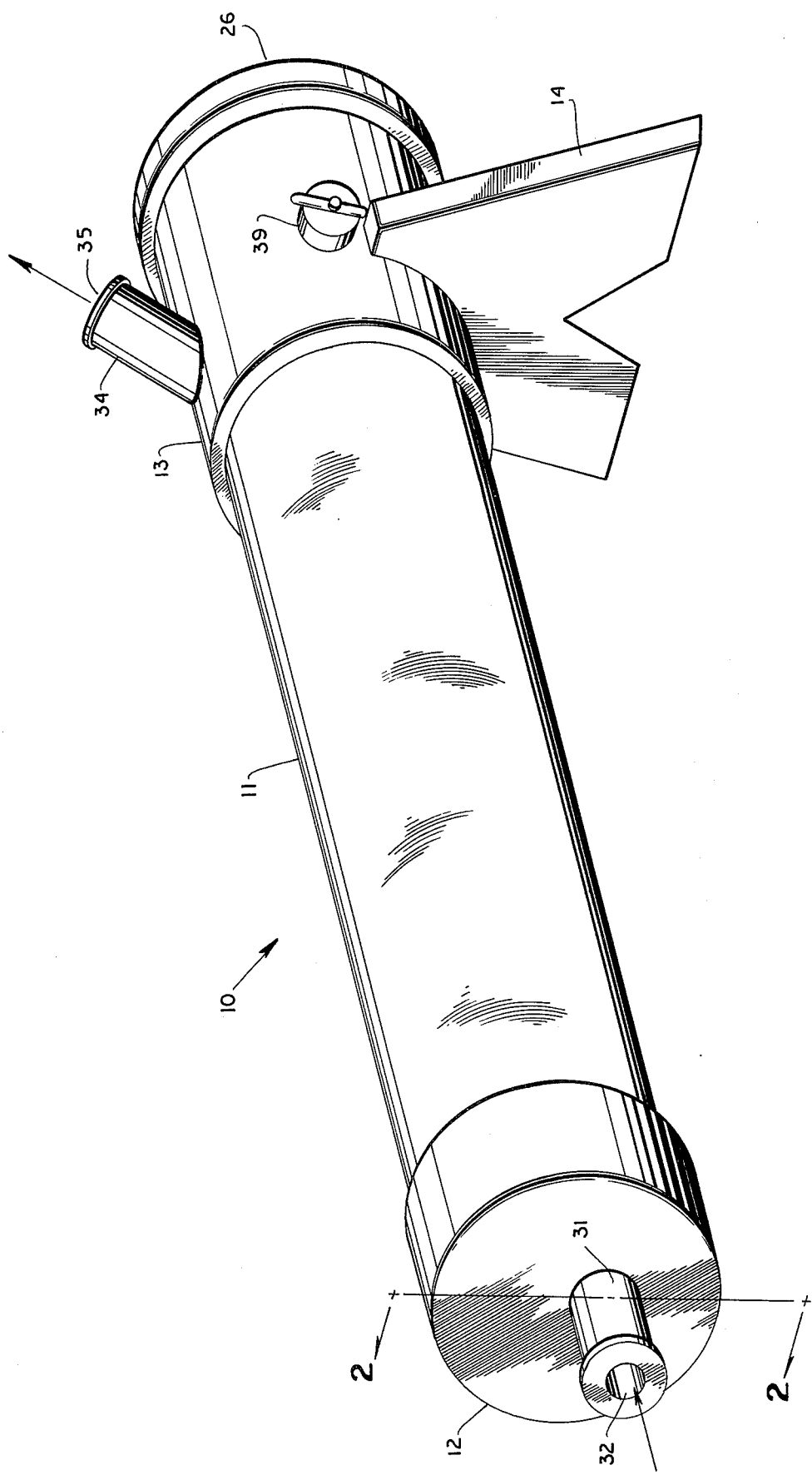
FIG. 1 shows a pictorial view of a disclosed embodiment of the present invention.

Stated in general terms, the present invention includes a body defining a chamber for receiving a solid soluble chemical composition, with the body being supportable on a horizontal surface so that the chamber occupies an inclined position relative to the horizontal surface. The lower end of the chamber is provided with a liquid inlet which can be connected into a liquid flow system, and which directs a jet of liquid to the lower end of the chamber in a generally-longitudinal direction. A fluid outlet opening is provided at the upper end of the inclined chamber, and the fluid outlet opening is positioned at the point of maximum elevation with the chamber. Gas which is evolved within the inclined chamber by erosion, decomposition, or other effects of the liquid jet impinging the soluble chemical composition within the chamber is completely removed from the chamber by the placement of the fluid outlet opening, even if the gas has not become absorbed by the water within the chamber.

Stated more specifically with respect to the disclosed embodiment of the present invention shown in FIGS. 1-5, there is shown a jet feeding apparatus indicated generally at 10 and having an elongate body member 11 closed at the lower end by a lower end cap 12 and closed at the upper end by an upper end cap 13. The upper end cap 13 is provided with a support stand 14 which depends downwardly from the upper end cap to be received on a horizontal support surface 15. The lower end cap 12 simply rests on the horizontal surface 15 for support, causing the body 11 of the jet feeding apparatus to assume an inclined angular position relative to the horizontal surface. Although the exact angle of incline is not considered to be critical in the operation of the present jet feeding apparatus, an angle of inclination $a$ of approximately 10° has proved to be effective in an actual embodiment of apparatus constructed according to the present invention.

The body 11 in the disclosed embodiment may be generally tubular in construction, and may be made of any suitable material which is impervious to water (or any other liquid flowing therethrough) and which is not subject to attack by any chemicals contained in or released from the solid soluble chemical composition received within. In the case of a jet feeder apparatus used with appropriate soluble chemical compositions intended to add chlorine to a water circulating system, for example, the body 11 may be made of a material such as clear PVC tube. The body 11 defines an elongate internal chamber 19 of tubular cross-section and having sufficient diameter to allow the generally cylindrical solid sticks 20a and 20b of soluble chemical composition to be loosely received within the chamber, with sufficient clearance between the external surface of the sticks and the interior wall defining the chamber 19 to provide an annular region 21 along which fluid can flow in a longitudinal direction alongside the exterior surfaces of the sticks. It is apparent from FIG. 2 that the longitudinal extent of the body 11 is sufficient to accommodate two chemical sticks 20a and 20b arranged in serial manner within the chamber 19.

Each of the chemical sticks 20a and 20b is made of a suitable solid soluble chemical composition which, when subjected to the flow of water through the chamber 19 as described below, dissolves at a controlled rate to release a chemical substance. The released chemical substance goes into solution with the water, or is carried by the water to flow out of the jet feeding apparatus. Specific details of the type and nature of the chemical compositions which may be incorporated in the chemical sticks 20a and 20b are available to those skilled in the art, and need not be recited herein.

Each of the chemical sticks 20a and 20b has an elongate interior passage 22 extending therethrough, and the jet feeding apparatus can be provided with an elongate rod 23 extending longitudinally within the length of the chamber 19 in alignment with the aligned interior passages of the serially-positioned sticks 20a and 20b. The rod 23, which has a diameter substantially less than the diameter of the interior passages 22, is received at its lower end by a rod holder 24 which is retained within the lower end cap 12. The upper end of the rod 23 may be loosely received within the opening 25 of the removable end plug 26.

Referring to FIG. 5, it is seen that the rod holder 24 is spider-shaped to define a number of apertures 30 extending radially from the central portion of the rod holder in which the rod 23 is received. The lower end cap 12 includes a liquid inlet connector 31 having an inlet opening 32 which is somewhat off-center with respect to the center of the chamber 19 and of the lower end cap. As best seen in FIG. 5, the off-center position of the inlet opening 32 allows liquid flowing through the inlet opening to pass around the central portion of the rod holder 24, so that such liquid is directed into the chamber 19 substantially as a jet of liquid which is directed to flow in a generally longitudinal direction for impingement against the lower end 33 of the chemical stick 20a.

The upper end cap 13 has a fluid outlet connector 34 defining an outlet opening 35 in fluid flow communication with the chamber 19. The outlet opening 35 communicates with the chamber 19 at the uppermost portion of the chamber upper end, as is particularly seen in FIG. 2. The upper end cap 13 defines an internal opening 36 which is sufficiently large to accommodate the passage of the chemical sticks 20a and 20b, and which is selectively closed by the aforementioned end plug 26. The end plug 26 may be removably connected to the upper end cap 13 by any suitable connection such as the pipe threads 37, and an O-ring seal 38 may be provided to ensure a fluid-tight seal of the closed upper end cap 13.

Considering the operation of the disclosed jet feeding apparatus, the apparatus is connected into a particular water circulation system so that water flowing through the system is introduced to the jet feeding apparatus through the liquid inlet connector 31, with the consequence that the water flows into the chamber 19 of the feeder in a generally longitudinal jet which impinges against the lower end 33 of the chemical stick 20a. The force of the water jet causes erosion of the lower end 33 of the stick, thereby releasing an amount of chemical composition from the stick to be absorbed in or carried by the water flowing through the jet feeding apparatus. The water also flows along the annular region 21 outside of the sticks 20a and 20b to cause further erosion and dissolution of the sticks. Moreover, the sticks 20a and 20b tend to be forced upwardly within the chamber 19 as a result of the impact of the liquid jet against the lower end 33 of the stick 20a, allowing a portion of the inflowing jet of water to flow through the aligned elongate interior passages 22 of the chemical sticks. Erosion and/or dissolution of the chemical sticks thus occurs along three regions of the sticks, namely, at the point of jet impact against the lower end 33 of the stick 20a, along the exterior surfaces of the two sticks, and along the interior surfaces which define the passages 22 through the sticks. Where the chemical released by erosion and/or dissolution of the chemical sticks is released in the form of a gas which may not be immediately and entirely absorbed by the water within the jet feeder, the gas is allowed to be removed from the feeder by flowing through the uppermost-positioned outlet opening 35 without becoming entrapped in an upper-elevation location of the feeder.

The state of erosion of the chemical sticks within the feeding apparatus can be visually monitored by observation through the transparent body 11, and the chemical sticks can be replaced simply by shutting off the water circulation system and then removing the end cap 26 from the upper end cap 13. A pressure release valve 39 is provided on the upper end cap 13 to permit the release of any hydrostatic pressure which may remain within the jet feeding apparatus, prior to removal of the end cap 26 for replacement of chemical sticks.

Figure 6:
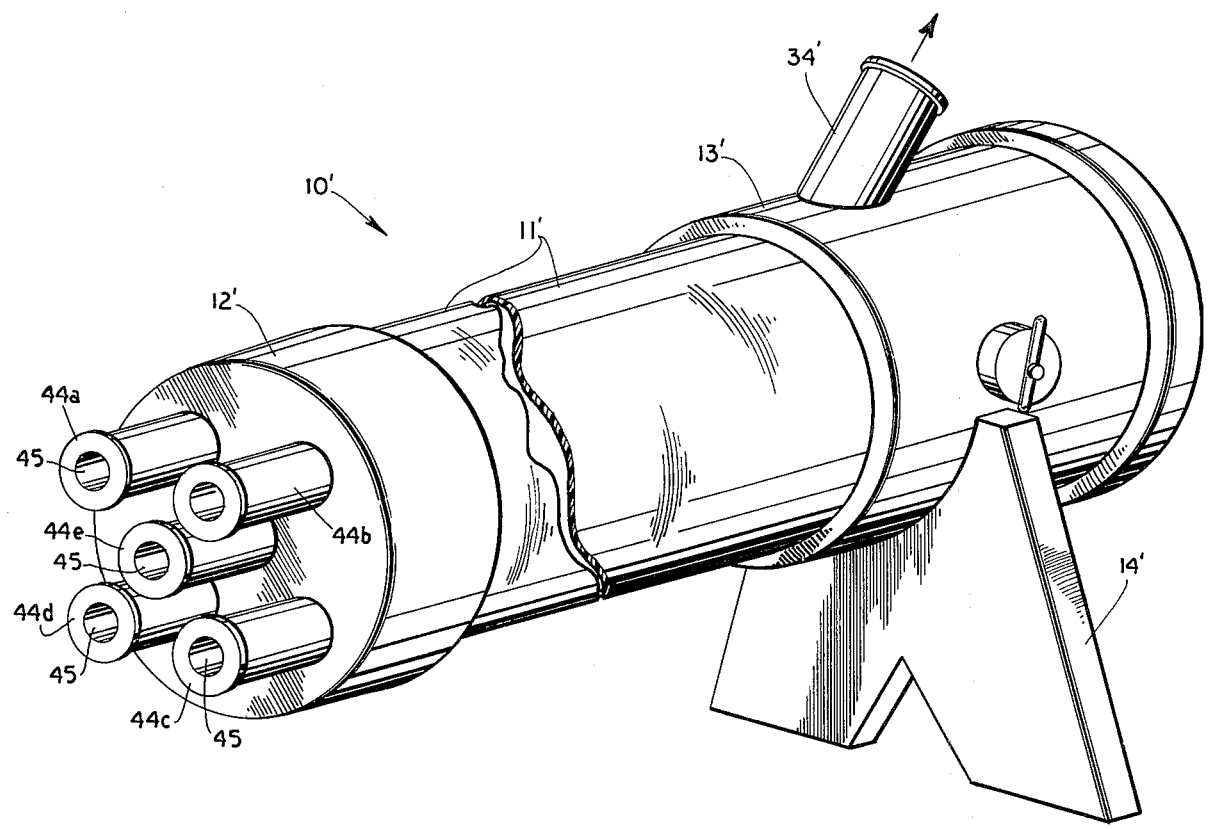
FIG. 6 shows a broken pictorial view of an alternative disclosed embodiment of the present invention.
Figure 7:
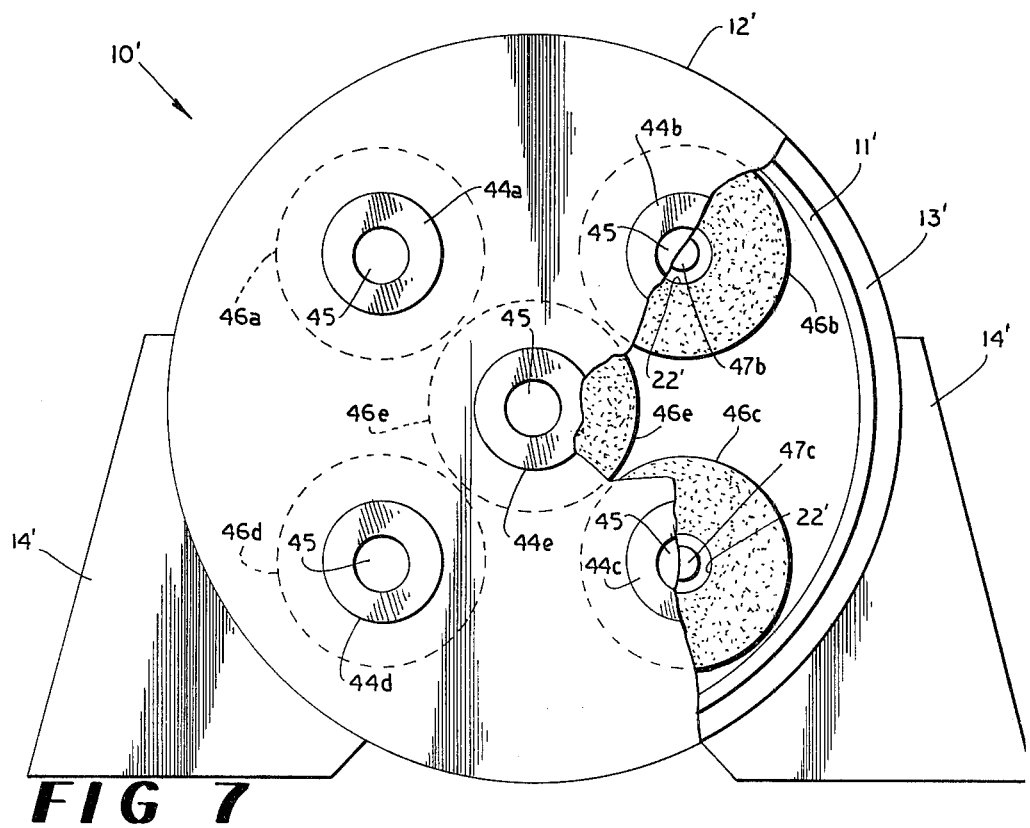
FIG. 7 is an end elevation view of the embodiment shown in FIG. 6, with the lower end cap depicted partially cut away for illustrative purposes.

A modified version of the embodiment described in FIGS. 1–5 is shown in FIGS. 6 and 7, where components which are common to the embodiments depicted in FIGS. 1–5 are identified by primed reference numerals. As seen in FIG. 6, the jet feeding apparatus indicated generally at 10' includes a body 11' having a lower end cap 12', an upper end cap 13', and a support stand 14' depending downwardly from the upper end cap to maintain the feeding apparatus 10' at an angle of elevation with respect to a horizontal support surface. The jet feeding apparatus 10' differs from the previously-described feeding apparatus 10, shown in FIGS. 1–5, by having a plural number of chemical sticks disposed in parallel flow relation within the body 11', with each of the parallel-flow sticks positioned for impingement by a separate stream or jet of liquid entering the apparatus 10' through a separate corresponding liquid inlet disposed in the lower end cap 12'.

It is seen that the lower end cap 12' is provided with a plural number of liquid inlet connectors 44a, 44b, 44c, 44d and 44e symetrically arranged around the lower end cap. Each of the liquid inlet connectors 44a–44e has an inlet opening 45 extending therethrough, in a manner analogous to the inlet opening 32 extending through the connector 31 as shown in FIG. 2.

A plurality of chemical sticks 46a–46e, are disposed within the body of the jet feeding apparatus 10' in predetermined position to place a separate one of the chemical sticks in alignment with the corresponding inlet opening 45 in each of the plural liquid inlet connectors. As seen in the cutaway portion of FIG. 7, for example, the chemical stick 46b is disposed behind and in alignment with the inlet opening 45 in the liquid inlet connector 44b, while the chemical sticks 46c and 46e are similarly aligned with the inlet openings 45 in the corresponding inlet connectors 44c and 44e. The locations of chemical sticks 46a and 46d for the remaining two liquid inlet connectors 44a and 44d are shown in broken-line in FIG. 7.

Separate elongate rods are mounted within the body 11' of the jet feeding apparatus 10' to extend through the elongate passages 22' in the chemical sticks and to define the respective locations of each of the chemical sticks, with two such rods being shown at 47b and 47c in FIG. 7. It will be understood by those skilled in the art that suitable rod holding apparatus can be provided within the body 11' to locate and support the rods 47b and 47c, as well as the rods corresponding to the remainder of the chemical sticks 46a–46e. It will also be apparent to those of ordinary skill that the choice of five separate chemical sticks and corresponding liquid inlet connectors, as shown in FIGS. 6 and 7, is not critical to the present invention; a greater or lesser number of sticks can be provided. It will also be apparent, although not explicitly depicted in FIGS. 6 and 7, that each of the chemical sticks 46a–46e may actually comprise more than one single stick disposed in serial fashion along the corresponding elongate rod, in a manner corresponding to the sticks 20a and 20b shown in FIG. 2.

The use of the embodiment shown in FIGS. 6 and 7 is substantially the same as in the previous embodiment, with the exception that the several liquid inlet connectors 44a–44e are connected in parallel through a suitable manifold or other liquid distribution arrangement to receive liquid flowing through a particular water circulation system. The flow of water or other liquid into the jet feeding apparatus 10' is preferably divided approximately evenly between the several liquid inlet connectors, so that each of the symmetrically-arranged chemical sticks will be eroded at approximately the same rate and will require replacement at approximately the same time, thereby minimizing maintenance costs and downtime of the jet feeder. Water flows both along the inside and the outside of each of the chemical sticks, in the manner described previously, and exits through the fluid outlet connector 34' disposed at the uppermost region of the upper end cap 13. As discussed previously, any evolved gas which is not entirely absorbed by the water within the jet feeder 10' will flow to the upper end of the feeder for removal through the fluid outlet connector 34'.

It will be apparent that the foregoing relates only to a preferred embodiment of the present invention, and that numerous alterations and modifications may be made therein within the scope of the invention as defined in the following claims.

What is claimed is:

1. Apparatus for feeding a chemical into a liquid by directing liquid against a soluble chemical composition, comprising:

body means defining a chamber for receiving a solid body of the soluble chemical composition, said chamber having a longitudinal dimension and being positioned for support on a horizontal surface with said longitudinal chamber disposed at an incline with respect to the horizontal;

liquid inlet means in said body means in liquid flow communication with the lower end of said inclined chamber; and fluid outlet means in said body means in fluid flow communication with the uppermost location within said inclined chamber means to permit the gaseous fluid produced by dissolution of the chemical composition in said inclined chamber to exit through said fluid outlet means without being entrapped within said inclined chamber.

2. Apparatus as in claim 1, wherein said liquid inlet means is aligned to direct a flow of liquid into said inclined chamber substantially in the longitudinal direction to impinge on an end of the body of soluble chemical composition received in said inclined chamber.

3. Apparatus as in claim 1, wherein said inclined chamber is elongated in said longitudinal direction to receive a body of soluble chemical composition in the form of an elongate stick, and said liquid inlet means is aligned at said lower end of said inclined chamber to direct a jet of liquid into said inclined chamber in said longitudinal direction to impinge the lowermost end of the elongate stick.

4. Apparatus as in claim 3, in which the soluble elongate stick has at least one longitudinal internal passage extending along the entire length of the stick, and has a wall of substantial thickness, and said liquid inlet means is aligned to direct the jet of liquid longitudinally into impingement against the lowermost end of the wall of the stick at a location thereon which is intermediate the internal passage and the exterior of the stick to allow the jet of liquid to flow longitudinally through the internal passage of the stick as well as longitudinally along the exterior of the stick, thereby increasing the area of the stick which is contacted by the liquid jet.

5. Apparatus as in claim 1, further comprising support means associated with said body means for maintaining said body means and said chamber in said inclined position when said support means is supported by a horizontal surface.

6. Apparatus as in claim 1, wherein said body means comprises:

a hollow longitudinally elongate tube having internal dimensions to receive at least one elongate stick of the soluble chemical composition;

a lower end member enclosing the lower end of said tube;

said liquid inlet means being disposed in said lower end member in position to direct a longitudinal jet of liquid into impingement against the lower end of the stick received in said hollow tube;

an upper end member enclosing the upper end of said tube and having a selectively closable end opening longitudinally aligned with said tube for inserting the soluble stick; and said fluid outlet means being mounted in the upper side of said upper end member to extend therethrough into flow communication with said tube.

7. Apparatus as in claim 6, wherein the elongate stick has a longitudinal interior passage, and further comprising:

a longitudinal rod extending within said elongate tube from said lower end member to said upper end member; and said rod having a diameter substantially less than the diameter of the interior passage through the elongate stick and being aligned to extend through the interior passage.

8. Apparatus as in claim 6, further including means in fluid communication with the interior of said elongate tube and selectively operable to release the pressure within the interior to atmosphere.

* * * * *